Feb. 17, 1959
M. S. SPARKS, JR
2,874,297
ANALYZER
Filed Nov. 8, 1954
2 Sheets-Sheet 1
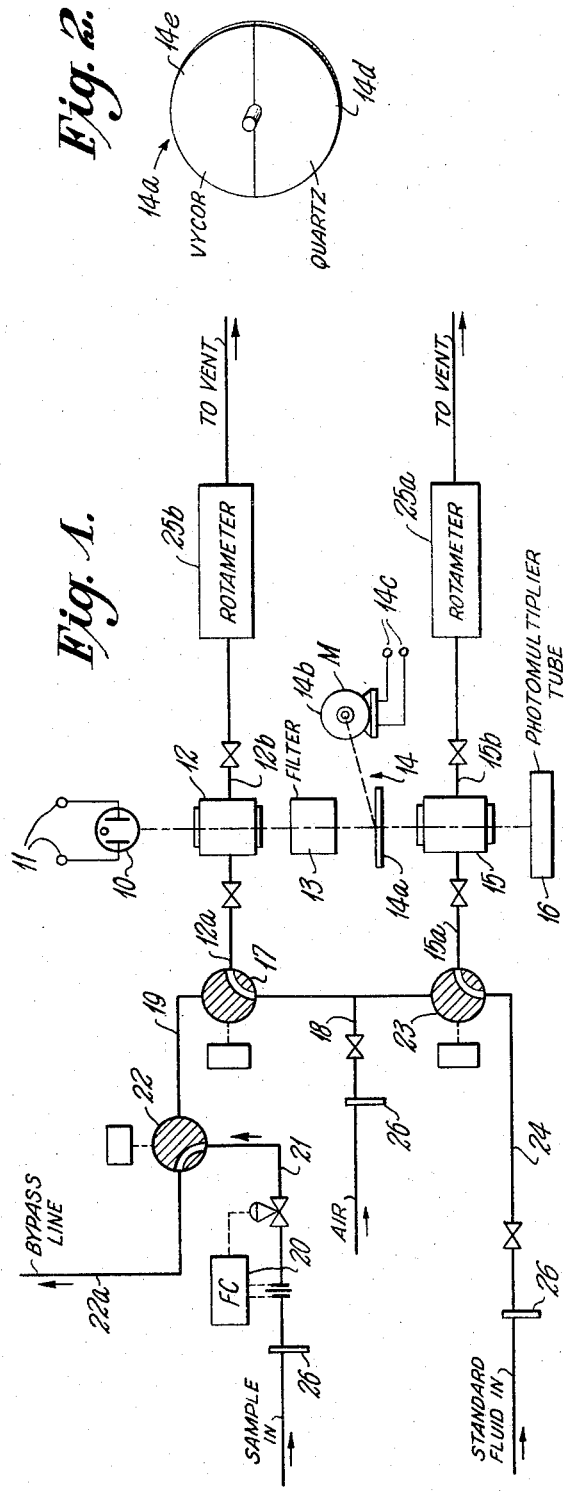
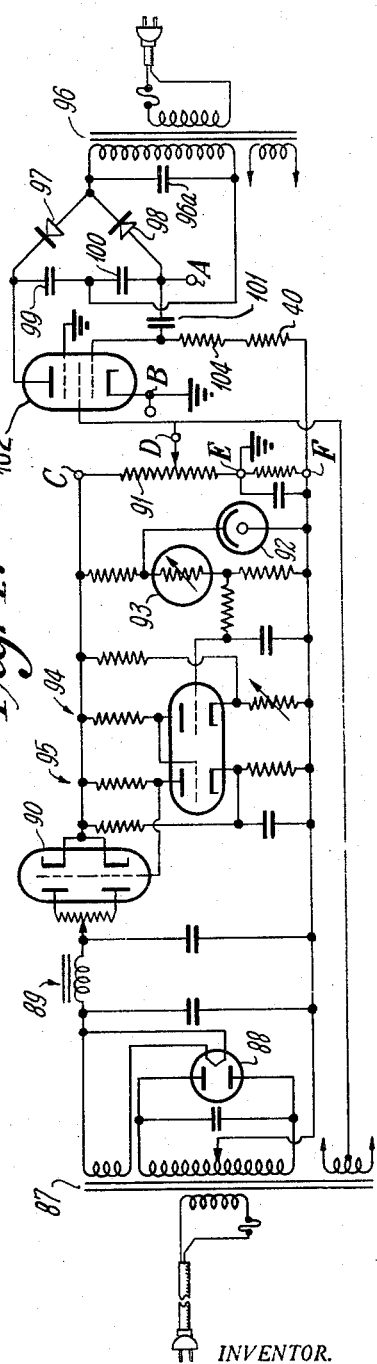
INVENTOR.
*M. S. Sparks, Jr.*
BY
*Hudson & Young*
ATTORNEYS Feb. 17, 1959

M. S. SPARKS, JR 2,874,297

ANALYZER

Filed Nov. 8, 1954

INVENTOR.
M. S. Sparks, Jr.
BY
Hudson & Young
ATTORNEYS

United States Patent Office 2,874,297
Patented Feb. 17, 1959

2,874,297
ANALYZER

Marshall S. Sparks, Jr., Bartlesville, Okla., assignor to Phillips Petroleum Company, a corporation of Delaware Application November 8, 1954, Serial No. 467,483

6 Claims. (Cl. 250—43.5)

This invention relates to analyzers utilizing radiation. In another aspect, it relates to a standardization system for periodically calibrating such analyzers.

Heretofore, many types of analyzers have been devised, wherein a beam of radiation is passed through a sample of material to be analyzed, the intensity of the radiation beam, after passing through the sample material, being representative of the concentration of a selected component or group of components in the sample material. In such circuits, there is an optical system capable of passing the radiation beam through the sample material, and an electric circuit for indicating or recording the beam intensity after it has passed through the sample material. In such instruments, aging of the circuit components and optical components, variations in radiation intensity due, for example, to variations in applied voltage, and numerous other factors oftentimes contribute to cause "drift" of the instrument reading. That is, the output indicated by the instrument is affected by aging of components and variations in supply voltage in addition to the variations caused by changes in concentration of the sample material.

This undesirable condition can be remedied by providing automatic standardization of the instrument, wherein adjustments are periodically made to the circuit components to compensate and counterbalance the effects produced by aging of components, variations in supply voltage, and other factors causing drift. A suitable standardization system of this type is disclosed in Hutchins Patent 2,579,825.

In accordance with this invention, a standardizing circuit of improved character is provided wherein the test material and a standard material are alternately interposed in a radiation beam, and an electrical output voltage is produced which is representtive of the beam intensity after it has passed through the material. A bucking voltage is produced which is fed to the input of an amplifier in opposition to the output voltage, and the output of the amplifier is, in turn, fed to a device which adjusts the magnitude of the bucking voltage until it is equal to that of the output voltage.

When the test material is interposed in the beam, the amount of adjustment necessary to provide a balanced condition is representative of the concentration of a selected component or components in the test material. When the standard material is interposed in the beam, a fixed constant output voltage is obtained in the absence of drift. However, if drift has occurred, the output voltage will vary from its predetermined value during the standardization cycle, and the magnitude of the bucking voltage is accordingly adjusted to compensate for this change in output voltage, this adjustment carrying over into subsequent balancing or analyzing cycles.

It is an object of the invention to provide an improved standardization system for an analyzer utilizing radiation.

It is a further object to provide a novel indicating or recording circuit employing a bucking voltage in an analyzer utilizing radiation.

It is a further object to provide an instrument which is reliable in operation, accurate, and utilizes a minimum number of optical and electrical components.

Various other objects, advantages and features of the invention will become apparent from the following detailed description taken in conjunction with the accompanying drawings, in which:

Figure 1 is a diagram illustrating the optical system and sample feeding unit of an instrument constructed in accordance with the invention;

Figure 2 is a view of a scanning disk;

Figure 4 is a schematic circuit diagram of the power supply unit.

Figure 3:
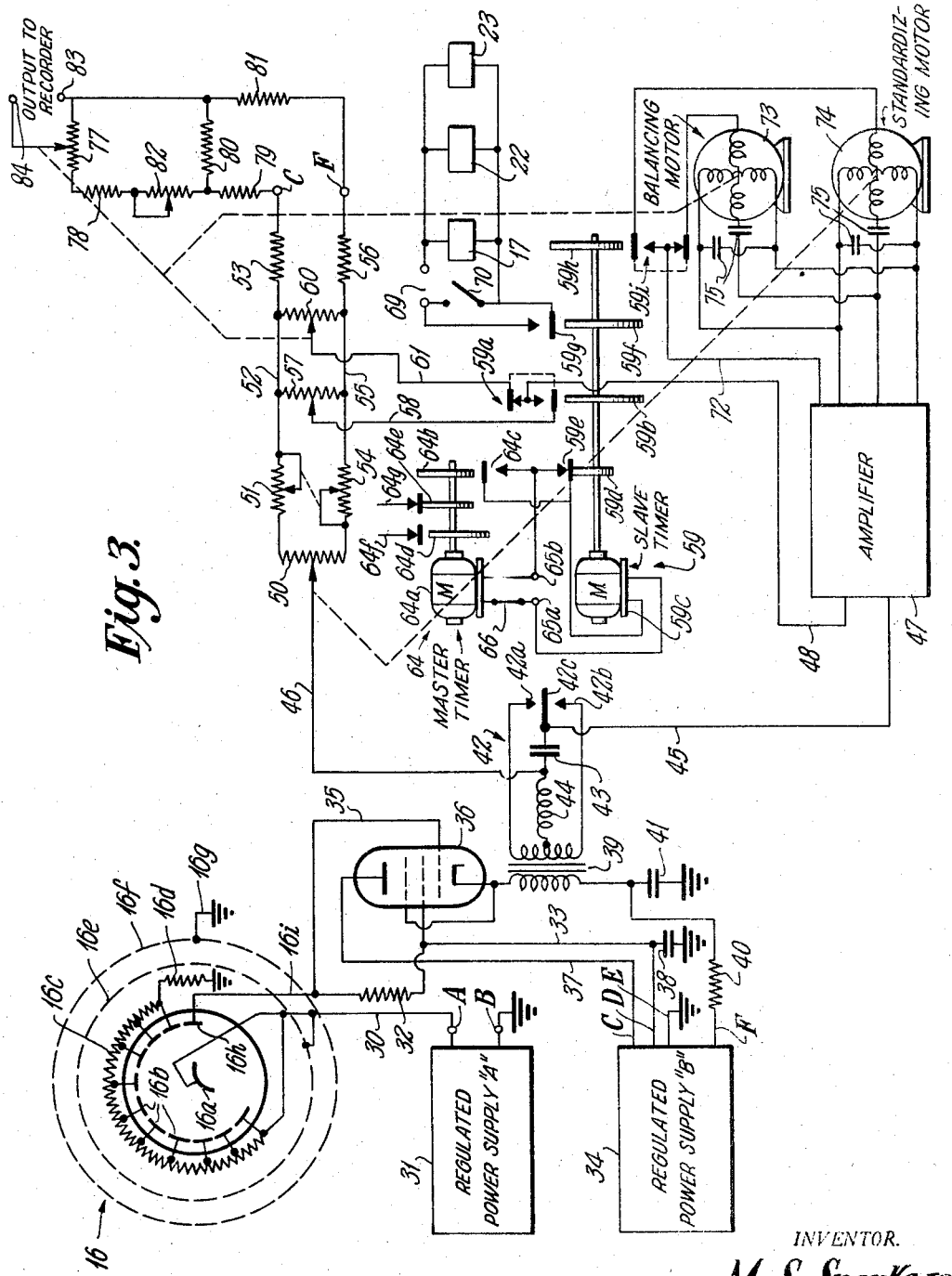
Figure 3 is a schematic circuit diagram of the indicating circuit and standardizing system.

Referring now to the drawings in detail, and particularly to Figures 1 and 2, I have shown a radiation source 10 supplied with an operating voltage from terminals 11 of a regulated power supply, not shown, this source emitting a beam of radiation which passes through a sample cell 12, filter 13, scanning mechanism 14 and a standard cell 15 to a radiation detector 16. In a preferred embodiment of the invention, the source 10 is a hydrogen lamp, which is a source of ultra-violet radiation, and the detector 16 is a photomultiplier tube. In this preferred embodiment, the scanning mechanism includes a rotating disk 14a driven by a motor 14b which is supplied with current from terminals 14c. The disk 14a can consist of a transparent section 14d and a section 14e having the same absorption characteristics as the sample under test, as more fully explained in the copending application of E. C. Miller, Serial No. 303,765, filed August 11, 1952, and entitled Analyzer, now U. S. Patent No. 2,764,692.

When the instrument is designed to analyze for butadiene, the filter 13 is advantageously designed to transmit wave lengths in the region of 1800 to 3000 angstron units, the section 14d is formed from quartz, and the section 14e is formed from Vycor, a heat resistant glass manufactured by Corning Glass Works, Corning, New York, containing approximately 96 percent silicon dioxide and having ultra-violet transmission characteristics approximating those of butadiene. The instrument of this invention is also very useful in quantitatively determining the amount of hydrogen sulfide present in a hydrocarbon stream. While, as will become apparent hereinafter, the standardization and indicating system of the invention has particular advantages when utilized with the preferred optical system just described, in its broader aspects, the standardization and indicating circuits are applicable to instruments utilizing various types of radiation, and having various arrangements of the optical system. In particular, the source 10 can be a source of infrared radiation, and the detecting elements can be devices, such as thermocouples or bolometers which are responsive to infrared radiation. Also, source 10 can emit radiation in the visible or other region of the spectrum. Finally, the optical system can utilize a plurality of radiation beams with the standard and sample material interposed in different beams or fed successively to a single cell.

It is a feature of the preferred instrument, however, that separate sample and standard cells are interposed in a single radiation beam, that air or other transparent fluid is fed to the cell when the standard or test material, as the case may be, is not present therein, and that the sample material is bypassed when it does not flow to the sample cell. To this end, the sample cell 12 is provided with a valved inlet line 12a leading to a three-way solenoid-actuated valve 17 which is selectively connectable with a valved air inlet 18 and a sample line 19. Sample material is fed to the line 19 through a flow controller 20, a pipe 21 and a three-way solenoid-operated valve 22 which connects pipe 21 either with the sample line 19 or a bypass line 22a.

Standard cell 15 has a valved inlet line 15a which is selectively connected by a three-way solenoid-operated valve 23 to the air line 18 and to a valved line 24 for admitting standard material to the instrument. The standard and sample cells are further provided with outlet lines 15b and 12b, respectively, which lead through rotameters 25a and 25b, respectively, to a vent passage or other disposal as desired. Each of the lines 18, 21 and 24 can be provided with a porous steel disk 26 which filters the fluid as it enters the instrument.

In operation, with source 10 and photomultiplier tube 16 energized and motor 14b operating scanning disk 14a, a sample fluid is fed through line 21, valve 22, line 19 and valve 17 to the sample cell 12 while air is fed to the standard cell 15 through line 18, valve 23 and line 15a. As the disk 14a rotates, transparent sections 14d and 14e are successively and rapidly interposed in the path of the radiation beam. As previously noted, section 14e has the same radiation absorption characteristics as the material being analyzed and, consequently, produces a signal corresponding to 100 percent concentration of the component of interest in the test stream. When transparent section 14d is interposed in the beam, the magnitude of the signal produced by detector 16 is proportional or representative of the concentration of the selected component in the sample cell. Thus, an output signal of alternating character is produced, the average amplitude of which is inversely proportional to the concentration of the component of interest in the sample stream, i. e., to the difference between 100 percent and the actual concentration of the selected component. The voltage wave itself, of course, consists of alternate rectangular waves of different heights.

After a period of operation determined by the timing circuits hereinafter described, valves 17, 22 and 23 are actuated to cause standard fluid to pass through line 24 and valve 23 into the standard cell. At this time, air passes through line 18, valve 17 and line 12a into the sample cell, and the sample is bypassed by flowing through line 21 and valve 22 to the line 22a. Thus, standard material of known composition is introduced into the path of the radiation beam instead of the sample material. This produces an output voltage at detector 16 which, in the absence of drift, would have a fixed predetermined average value. However, if a factor causing drift has occurred during the previous operating cycle, this output signal will vary from its fixed predetermined value. It will be understood that such drift could be caused by variation in supply voltage to the source 10 or detector 16, which factor is minimized by separate power supply circuits, aging of the source 10 or detector 16, fogging of one or more of the windows in cells 12 or 15, and drift resulting from temperature change in the filters 13 or either of the cells. In accordance with the invention, changes in this predetermined voltage are automatically applied in the standardization system to produce a correction compensating therefor to the end that the composition of the sample material is accurately indicated or recorded during the succeeding sample-analyzing cycles.

Referring now to Figure 3, it will be seen that the photomultiplier tube 16 has a cathode 16a which is connected by a lead 30 to a low potential terminal A of a regulated power supply 31. The tube 16 also has a series of dynodes 16b which are inter-connected by a network 16c of series resistances, one terminal of the network being connected to lead 30, and the other terminal of the network being grounded through a fixed resistance 16d. The tube 16 is further provided with an inner shield 16e which is connected to lead 30 and an outer shield 16f which is grounded at 16g. Also forming a part of the tube 16 is an anode 16h from which the electrical output is withdrawn. The anode 16h is connected by a lead 16l, a fixed resistance 32 and a lead 33 to a positive terminal D of a regulated power supply 34 which has a grounded low potential terminal E. It will be noted that power supply 31 has a grounded high potential terminal B so that the two power supplies are, in effect, connected in series to provide the requisite power for operating the photomultiplier tube.

The anode 16h is further connected by a lead 35 to the control grid of a cathode follower tube 36. The anode of this tube is connected to a high potential terminal C of power supply 34 by a lead 37, the suppressor grid is connected to the cathode of the tube, and the screen grid is connected by lead 33, which has a grounded bypass condenser 38, to the positive power supply terminal D. The cathode of the tube is connected through the primary winding of a transformer 39 and a resistor 40 to a low potential bias terminal F of the power supply 34, the lower end of the primary winding having a grounded bypass condenser 41 connected thereto. It will be understood that the alternating output voltage of the tube 16 is fed through the cathode follower 36 to the primary winding of the transformer 39.

The secondary winding of transformer 39 is connected to fixed contact points 42a, 42b of a vibrator 42 which is operated in synchronization with the scanning disk 14a, Figure 1. The vibrator 42 has a reed 42c which is connected through a condenser 43 and a choke 44 to a center tap on the secondary winding of transformer 39. The vibrator 42 serves as a rectifier while condenser 43 acts as a filter. Consequently, a rectified direct voltage appears between a lead 45 connected to the reed 42c and a lead 46 connected to the junction of condenser 43 and choke 44, this rectified voltage having a magnitude proportional to the average amplitude of the alternating output voltage produced by tube 16.

The lead 45 is connected to one input terminal of an amplifier 47, the other input terminal of which is connected to a lead 48. In accordance with the invention, a bucking voltage is produced between the leads 46 and 48 which is fed to the amplifier input in series with the rectified voltage appearing across leads 45 and 46. To this end, lead 46 is connected to the contactor of a potentiometer 50, one fixed terminal of which is connected in series with a variable resistance 51 a lead 52 and a fixed resistance 53 to the power supply terminal C while the other fixed terminal of potentiometer 50 is connected through a variable resistance 54, a lead 55 and a fixed resistance 56 to the power supply terminal F. Resistors 51, 54 and potentiometer 50, therefore, constitute a series connected unit across the leads 52 and 55, the variable resistors 51 and 54 being reversely ganged to provide a scale adjustment for the potentiometer 50.

A potentiometer 57 is connected across leads 52 and 55, the contactor of this potentiometer being connected by a lead 58 to one fixed contact of a set 59a actuated by a cam 59b of a slave timer 59. A potentiometer 60 is connected across leads 52, 55 and the contactor of this potentiometer is connected by a lead 61 to the other fixed contact of set 59a. A movable contact cooperates with these fixed contacts and is connected to lead 48 to the end that this amplifier input lead is connected either to the contactor of potentiometer 57 or to the contactor of potentiometer 60 depending upon the position of cam 59b. Due to the described connection of the resistor network 50, 51, 54, 57, 60, a standardizing voltage appears between leads 58, 46 while a bucking voltage appears across the leads 61 and 46 the magnitude of this voltage depending upon the relative positions of the potentiometer contactors. One or the other of these voltages, depending upon the position of cam 59b, is applied to the input of the amplifier in series with the rectified output voltage appearing across leads 45, 46.

The operation of the timer 59 which drives cam 59b is controlled by a master timer 64. This unit has a motor 64a which is connected to one of a set 65a, 65b of power supply terminals through a switch 66 and to the other terminal 65b of this set through a suitable lead. The motor 64a has a shaft which carries a cam 64b controlling a set of contacts 64c. The timer 59 has a motor 59c and a cam 59d which operates a contact set 59e. The motor 59c is connected to the power source 65a, 65b, through the contacts 59e and 64c which are connected in parallel.

During each revolution of cam 64b, there is a momentary closure of contacts 64c which initiates operation of motor 59c and thereby causes cam 59d to close contacts 59e, which remain closed for a full revolution of the shaft of timer 59. Thus, for each revolution of the shaft of timer 64, there is a complete revolution of the shaft of timer 59, the timing being so adjusted that the described actuation of timer 59 occupies only a small part of the cycle of timer 64.

In particular, timer 64 can make one revolution per hour and timer 59 can have a cycle of five minutes. The period during which the timer 59 is operable is referred to hereinafter as the standardization cycle while the remainder of the period of operation of timer 64 is referred to as the indicating cycle. During the indicating cycle, one proces stream can be analyzed or, alternatively, timer 64 can operate to successively admit samples of different materials to be analyzed to the path of the radiation beam so that a multiplicity of streams can be analyzed with a single instrument. To this end, I have shown cams 64d and 64e associated with contact sets 64f and 64g, respectively, which are capable of actuating solenoid valves to admit succesively a plurality of sample streams to the instrument during the indicating cycle.

However, as shown, only one process stream is analyzed during the indicating cycle and the controls for operating the solenoids of the sample and standard fluid valves are incorporated in timer 59. Specifically, timer 59 has a cam 59f which actuates a set of contacts 59g, these contacts being connected in series with a current source 69 and the solenoids of valves 17, 22, and 23, all of which are connected in parallel. The cam 59f is so shaped as to actuate the solenoids during the standardization cycle, and de-energize them during the indicating cycle. This causes air to pass through the standard cell and sample material to pass through the sample cell, during the indicating cycle, and causes air to pass through the sample cell, standard material to pass through the standard cell and the sample fluid to be bypassed during the standardization cycle, in the manner previously explained in detail. A switch 70 is connected in parallel with contacts 59 to permit valve actuation manually and thus provide standardization of the instrument whenever desired, independent of the operation of timer 59.

Timer 59 further operates cam 59b to cause the contactor of potentiometer 60 to be connected to lead 48 and the amplifier input during the indicating cycle and to cause the contactor of potentiometer 57 to be connected to lead 48 and the amplifier input during the standardization cycle, this being effected by the contact set 59a.

Timer 59 also includes a cam 59h which actuates a set of contacts 59i. These contacts selectively connect an amplifier output lead 72 to a balancing motor 73 or a standardization motor 74, the respective coils of the motor, with the exception of those connected to contact set 59, being connected to the amplifier output terminals in well understood fashion. Each of the motors 73, 74 has a condenser 75 connected in parallel with one winding thereof. During the indicating cycle, contacts 59i connect balancing motor 73 to the amplifier output and it will be noted that this motor is mechanically connected to the contactor of potentiometer 60 and to the contactor of a potentiometer 77.

An adjustable direct potential is applied across the fixed terminals of potentiometer 77 from power supply terminals C and F by a resistance network including fixed resistance 78, 79, 80, and 81 together with a variable resistance 82. One output terminal 83 of the instrument is connected to the junction between resistances 80, 81 and the other output terminal 84 is connected to the contactor of potentiometer 77. In this manner, an output voltage is produced which is indicative of the position of the contactors of potentiometers 60 and 77. It will be understood that this output is fed to any suitable recorder or indicating device, and the term indicating device in the appended claims is intended to cover both an indicating instrument and/or a recording instrument.

During the standardization cycle, contacts 59 connect the amplifier output to standardizing motor 74, which is mechanically connected to the contactor of potentiometer 50.

In the overall operation of the system, during the indicating cycle, timer 59 is de-energized so that, referring to Figure 1, air passes through the standard cell and sample material passes through the sample cell. A rectified voltage representative of the concentration of the material under analysis appears between leads 45, 46, and this voltage is fed to the input of amplifier 47 in series with the bucking voltage between lead 46, on the one hand, and leads 48, 61 and the contactor of potentiometer 60, on the other hand, it being recalled that contacts 59 connect lead 48 to lead 61 during the indicating cycle.

Also, balancing motor 73 receives the output of the amplifier, and this motor is mechanically connected, as stated, to the contactors of potentiometer 77 and 60. The action of the motor 73 is to drive the input voltage of the amplifier to zero by moving the contactor of potentiometer 60 until the bucking voltage is equal to the output voltage appearing across leads 45 and 46 so that a null condition is obtained. As the composition of the sample changes, the output voltage similarly changes with the result that the contactor of potentiometer 60 is moved successively to different positions to maintain the null condition. It follows that the position of the contactor of potentiometer 60, as well as that of the contactor of potentiometer 77, is representative of the amount of the component under analysis present in the sample stream, as is the voltage appearing across terminals 83 and 84.

At the end of the indicating cycle, timer 59 is actuated by timer 64 and passes through a complete cycle of operation. During this standardizing cycle, valves 17, 22, and 23 are actuated by the action of contact set 59g to cause air to pass through the sample cell 12, standard fluid to pass through standard cell 15, and the sample stream to be bypassed through the line 22a.

Responsive to the action of cam 59b and contact set 59a, lead 48 is switched from the contactor of potentiometer 60 to the contactor of potentiometer 57 and, by the action of contacts 59i, the output of amplifier 47 is disconnected from the balancing motor 73 and applied to the standardizing motor 74. As a result, the output appearing across leads 45, 46 is applied to the amplifier in series with the voltage appearing between leads 46 and 58. If no drift has occurred since the next preceding standardization cycle, the standardization voltage appearing between leads 46, 58 is equal to and balances the output voltage at leads 45, 46. Hence, no movement of motor 74 and potentiometer 50 occurs. However, if drift has occurred, the output voltage will be unequal to the standardizing voltage, and motor 74 will move potentiometer 50 until a balanced condition again prevails. This movement of the contactor of potentiometer 50 compensates for the error which would otherwise be introduced into the system by drift. It will be noted that this adjustment of potentiometer 50 varies the bucking voltage which will be compared with the output voltage at leads 45, 46 during the next indicating cycle, and thus, in effect, changes the index position of the contactor of potentiometer 60 during this next indicating cycle.

At the end of the standardizing cycle, timer 59 connects motor 73 to the amplifier and then stops while the rotation of timer 64 continues to carry out a new (indicating) cycle.

It will be noted that the standardization circuit described has many important advantages. In particular, a very rapid balancing action is obtained by driving the amplifier input voltage to zero with the variable bucking voltage controlled by the motor 73 or 74. It will be observed, in this connection, that adjustment of the contactor of potentiometer 50 during the standardizing cycle varies the bucking voltage developed during the next indicating cycle, since this bucking voltage appears between the contactor of potentiometer 50 and that of potentiometer 60. Further, a minimum number of circuit components is used. Finally, the use of the chopper 14a in combination with the other parts of the system enables advantage to be taken of alternating current in the optical portion of the system, and this, in turn, permits the system to operate with a minimum amount of drift. This is very desirable for, the lesser the amount of drift to be compensated for by the novel standardizing circuit, the more efficient and accurate its operation will be. The use of the rectifier and filter 42, 43 changes the alternating current developed at the output of the photocell to a direct current which can be quickly and accurately compared with the bucking voltage developed by the resistances 50, 57, and 60.

In Figure 4, I have shown a suitable power supply circuit for use with the described instrument. This circuit includes a power transformer 87, dual diode rectifier 88, inductance-capacitance filter 89, and voltage regulator tube 90 which supplies voltage to the terminals C, D, E, and F of a bleeder resistance 91. Regulation of the power supply is obtained through a regulator tube 92 and a temperature compensation device 93, the output of which is fed through two amplifier stages 94 and 95 to the control grid of regulator tube 90, thus producing a constant voltage output across the power supply terminals. Cooperating with the described power supply unit is a second regulated supply which includes a transformer 96, condenser 96a, rectifiers 97 and 98, condensers 99, 100, 101, and a rectifier tube 102, the cathode of which is grounded and connected to output terminal B, the other output terminal A being connected to the junction between rectifier 98 and condenser 100. Rectifier tube 102 is controlled by a voltage impressed upon its control grid which is connected to condenser 101 and through a fixed resistance 104 and the resistor 40 to power supply terminal F. In this manner, a regulated voltage for tube 16, Figure 1, is obtained, which is advantageous in reducing the amount of drift due to the variations in power supply voltage.

While the invention has been described in connection with a present, preferred embodiment thereof, it is to be understood that this description is illustrative only and is not intended to limit the invention.

I claim:

1. In an analyzer, in combination, a radiation source, radiation detection means responsive to radiation from said source, a timer, means actuated by said timer to alternately provide indicating cycles where the radiation reaching the detector means is affected by a test material in the path of said radiation and standardization cycles where the radiation reaching the detector means is affected by a standard material in the path of said radiation, means for producing an output voltage which is a function of the quantity of radiation reaching said detector means, an amplifier, means for producing a variable bucking voltage, means for varying said bucking voltage, means independent of said varying means to change the magnitude of said bucking voltage, means for producing a standardizing voltage, means actuated by said timing means during each indicating cycle to apply said output voltage and said bucking voltage in series to the input of said amplifier and to connect the output of said amplifier to said varying means, and means actuated by said timing means during each standardization cycle to apply said output voltage and said standardizing voltage in series to the input of said amplifier and to connect the output of said amplifier to said independent means.

2. In an analyzer, in combination, a radiation source, a radiation detector, means for directing a beam of radiation from said source onto said detector, means connected to said detector to produce an output voltage representative of the intensity of said radiation beam, timing means for alternately passing a test fluid and a standard fluid through said beam, an amplifier, means for producing a variable bucking voltage, means for varying said bucking voltage, means independent of said varying means to change the magnitude of said bucking voltage, means for producing a standardizing voltage, means actuated by said timing means when said test fluid is interposed in said radiation beam to apply said output voltage and said bucking voltage in series to the input of said amplifier and to connect the output of said amplifier to said varying means, and means actuated by said timing means when said standard fluid is interposed in said radiation beam to apply said output voltage and said standardizing voltage in series to the input of said amplifier and to connect the output of said amplifier to said independent means.

3. In an analyzer, in combination, a source of direct ultraviolet radiation, a photomultiplier tube responsive to said ultraviolet radiation, a chopper interposed between said source and said tube, a pair of terminals for receiving an alternating voltage representative of the intensity of radiation reaching said cell, timing means for alternately interposing a test material and a standard material in said beam, an amplifier, a rectifying vibrator operating in synchronism with said chopper and connected to said terminals, a filter fed by said vibrator, means for producing a variable bucking voltage, means for varying said bucking voltage, means independent of said varying means to change the magnitude of said bucking voltage, means for producing a standardizing voltage, means actuated by said timing means when said test material is interposed in said radiation beam to apply the output of said filter and said bucking voltage in series to the input of said amplifier and to connect the output of said amplifier to said varying means, and means actuated by said timing means when said standard material is interposed in said radiation beam to apply the output of said filter and said standardizing voltage in series to the input of said amplifier and to connect the output of said amplifier to said independent means.

4. In an analyzer, in combination, a radiation source, a radiation detector, means for directing a beam of radiation from said source onto said detector, means connected to said detector to produce an output voltage representative of the intensity of said radiation beam, timing means for alternately interposing a test material and a standard material in said beam, an amplifier, first and second potentiometers, means for impressing a direct voltage upon the fixed terminals of both potentiometers, whereby a bucking voltage appears between the contactors of said potentiometers, a terminal maintained at a reference potential, whereby a standardizing voltage appears between said terminal and the contactor of said first potentiometer, a standardizing motor connected to the contactor of said first potentiometer, a balancing motor connected to the contactor of said second potentiometer, means actuated by said timing means when said test material is interposed in said radiation beam to apply said output voltage and said bucking voltage in series to the input of said amplifier and to connect the output of said amplifier to said balancing motor, means actuated by said timing means when said standard material is interposed in said radiation beam to apply said output voltage and said standardizing voltage in series to the input of said amplifier and to connect the output of said amplifier to said standardizing motor, and indicating means responsive to the position of the contactor of said second potentiometer.

5. In an analyzer, in combination, a radiation detector, means for producing an electrical voltage representative of the output of said detector, an amplifier, first and second potentiometers connected in parallel, means for impressing a direct voltage across the fixed terminals of said potentiometers, a unit connected in parallel with said potentiometers, said unit including a first variable resistance, a third potentiometer and a second variable resistance all connected in series, said variable resistances being reversely ganged to provide a range adjustment, whereby a bucking voltage appears across the contactors of said second and third potentiometers and a standardizing voltage appears across the contactors of said first and third potentiometers, a standardizing motor connected to the contactor of said third potentiometer, a balancing motor connected to the contactor of said second potentiometer, and a timer actuatable alternately to (a) apply said electrical voltage and said bucking voltage in series to the input of said amplifier and connect the output of said amplifier to said balancing motor and (b) apply said electrical voltage and said standardizing voltage in series to the input of said amplifier and connect the output of said amplifier to said standardizing motor.

6. In an analyzer, in combination, a radation detector, means for producing an electrical voltage representative of the output of said detector, an amplifier, first, second and third potentiometers connected in parallel, means for impressing a direct voltage across the fixed terminals of said potentiometers, whereby a bucking voltage appears across the contactors of said second and third potentiometers and a standardizing voltage appears across the contactors of said first and third potentiometers, a standardizing motor connected to the contactor of said third potentiometer, a balancing motor connected to the contactor of said second potentiometer, and a timer actuatable alternately to (a) apply said electrical voltage and said bucking voltage in series to the input of said amplifier and connect the output of said amplifier to said balancing motor and (b) apply said electrical voltage and said standardizing voltage in series to the input of said amplifier and connect the output of said amplifier to said standardizing motor.

References Cited in the file of this patent

UNITED STATES PATENTS

| | | |
|---|---|---|
| 2,577,735 | Broomell | Dec. 11, 1951 |
| 2,613,572 | Mathieu | Oct. 14, 1952 |
| 2,621,298 | Wild et al. | Dec. 9, 1952 |
| 2,764,692 | Miller | Sept. 25, 1956 |